United States Patent [19]

Yamana et al.

[11] Patent Number: 4,798,967
[45] Date of Patent: Jan. 17, 1989

[54] CONTROL SYSTEM FOR FOLDABLE OUTSIDE REARVIEW MIRROR

[75] Inventors: Tohru Yamana, Fujieda; Kiyoshi Nakayama, Shizuoka; Kazuhiko Sato, Kyoto, all of Japan

[73] Assignees: Murakami Kaimeido Co, Shizuoka; Omuron Tateishi Electronics Co., Kyoto, both of Japan

[21] Appl. No.: 173,154

[22] Filed: Mar. 24, 1988

[51] Int. Cl.$^4$ .................. G02B 7/18; G05B 19/10
[52] U.S. Cl. .................. 307/10 R; 350/604; 350/637; 248/479; 318/466; 318/568
[58] Field of Search .......... 307/10 R; 350/604, 605, 350/606, 615, 624, 625, 626, 629, 631, 632, 633, 634, 635, 636, 637; 248/466, 479, 480, 481, 485, 486, 487, 478, 477, 484; 318/467, 468, 466, 568, 600, 601, 293; 340/52 R

[56] References Cited

U.S. PATENT DOCUMENTS

| | | | | |
|---|---|---|---|---|
| 4,267,494 | 5/1981 | Matsuoka et al. | ............... | 307/10 R |
| 4,626,083 | 12/1986 | Nakayama et al. | ............... | 350/604 |
| 4,626,084 | 12/1986 | Kumai | ............... | 350/604 |
| 4,657,362 | 4/1987 | Suzuki | ............... | 248/479 X |
| 4,681,409 | 7/1987 | Enomoto | ............... | 350/637 |
| 4,682,088 | 7/1987 | Sullivan | ............... | 318/568 |
| 4,727,302 | 2/1988 | Mizuta et al. | ............... | 318/466 X |

FOREIGN PATENT DOCUMENTS 215444 4/1984 Japan .

Primary Examiner—William M. Shoop, Jr.
Assistant Examiner—Paul Ip
Attorney, Agent, or Firm—Michael J. Striker

[57] ABSTRACT

A control system for a foldable outside rearview mirror comprises an electric motor having an electric motor circuit, an operation switch, trigger element connected with the operation switch for outputting a trigger pulse in response to actuation of the operation switch, timer element connected with the trigger element for outputting a pulse of a predetermined pulse width to drive the electric motor only for a set time upon receipt of the trigger pulse from the trigger element, polarity changing element having a pair of outputs of high and low level and formed for reversely switching the electric motor by inverting the pair of the outputs upon receipt of the trigger pulse from the trigger element, and switching element for switching a voltage applied to the electric motor to react or fold a rearview mirror upon receipt of the output of the polarity changing element.

9 Claims, 3 Drawing Sheets

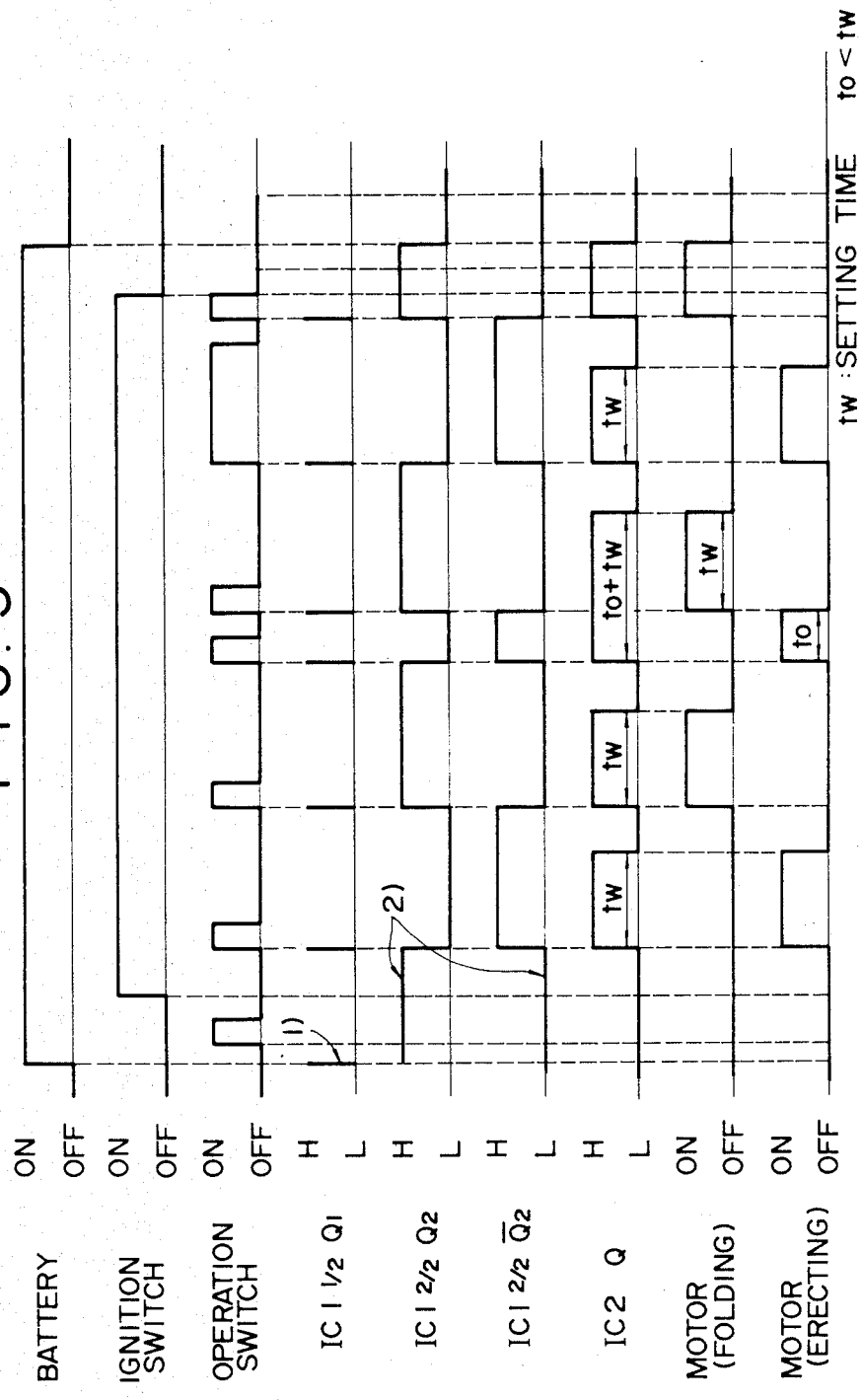

CONTROL SYSTEM FOR FOLDABLE OUTSIDE REARVIEW MIRROR

BACKGROUND OF THE INVENTION

This invention relates to control system for a foldable outside rearview mirror for a motor vehicle, and more particularly, for such an outside rearview mirror which can be folded both forwardly and backwardly by remote control from inside of the motor vehicle.

A foldable rearview mirror of this type is generally erected or folded by swinging a mirror body when an electric motor for folding the rearview mirror mounted in the mirror body is driven by operating switches provided in the compartment of a motor vehicle.

In Japanese Patent Laid-open No. 21544/1975, a control system is composed of a seesaw type changeover switch, a pair of timer circuits for outputting ON signals only for a predetermined time upon receipt of an output signal from the switches to erect and fold a rearview mirror to a predetermined position, and a relay circuit for switching the polarity of the power source of an electric motor for driving the rearview mirror upon receipt of ON/OFF by the timer circuits. In this system, there are disadvantages that the operation switch is limited to the seesaw type changeover switch, the electric motor is caused to stop because of the output terminal of the relay being shorted when the switch is operated during the operation of the timers or the mirror body might be rotated in an opposite direction after the electric motor is gradally stopped.

SUMMARY OF THE INVENTION

It is therefore an object of this invention to provide a control system for a foldable outside rearview mirror to eliminate the erroneous operation for erecting and folding a mirror body by an immediate reverse rotation without a shortcircuit or stoppage of the mirror when operation switches are operated during the operation of a timer.

In order to achieve the object of the invention and to overcome the problems of the prior art, the control system for a foldable outside rearview mirror driven by an electric motor of the invention comprises an operation switch; trigger means for outputting a trigger pulse by said operation switch; timer means for outputting a pulse of a predetermined pulse width to drive the electric motor only for a set time upon receipt of the trigger pulse from the trigger means; polarity changing means for reversely switching the drive of the electric motor by inverting a pair of the outputs of high and low levels upon receipt of the trigger pulse from the trigger means; switching means for switching a voltage applied to the electric motor means to erect or fold the rearview mirror upon receipt of the output of the polarity changing means; and an electric motor circuit.

An automatic reset one-touch type push-button switch is employed as an operation switch. The changing means and the timer means are operated through the trigger means by the operation switch, the electric motor is operated in the polarity (for erecting or folding the mirror) set by the changing means for period of time set by the timer means to erect or fold the rearview mirror to a predetermined position. Further, when the operation switch is operated during the operation of the timer, the electric motor is reversed to reverse the swinging operation of the rearview mirror immediately. The motor means includes an electric motor for swinging the mirror body and a limit switch group for stopping the electric motor when the mirror body is rotated to a predetermined position.

The above and other objects, features and advantages of the present invention will become apparent from the following description and the appended claims taken in conjunction with the accompanying drawings which show by way of exampled preferred embodiments of the present invention and in which like component parts are designated by like reference numerals throughout the various figures.

BRIEF DESCRIPTION OF THE DRAWINGS

In the accompanying drawings:

FIG. 3 is a timing chart of FIG. 2.

DESCRIPTION OF THE PREFERRED EMBODIMENTS

Figure 1:
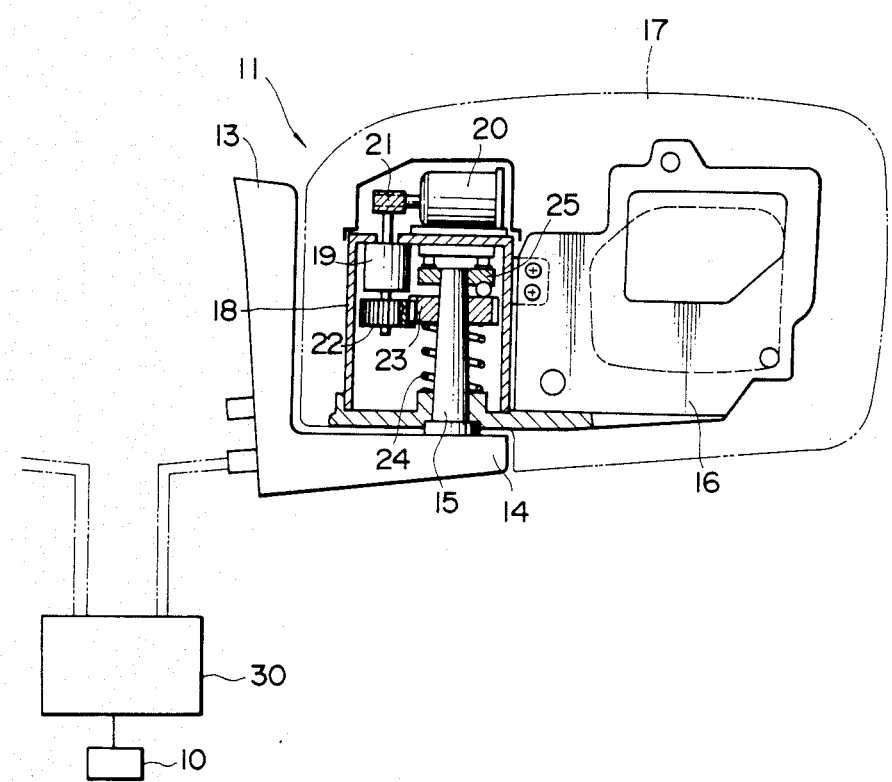
FIG. 1 is a schematic front view of a control system for a foldable outside rearview mirror according to a preferred embodiment of the present invention.

The present invention will now be described in detail with reference to the drawings. Referring first to FIG. 1, there is shown an outside rearview mirror assembly suitable to be associated with a motor vehicle. This system includes an operation switch 10 of an automatic reset type one-touch button switch provided in a compartment, a controller 30, right and left mirror assemblies 11 and motor circuits 51, 52. Each mirror assembly 11 includes a shaft 15 stood on the extension 14 of a base 13, a frame 16 rotatably supported to the shaft 15, a mirror body 17, a gear box 18 provided in the rotary portion of the frame 16 near the shaft, a reduction gear mechanism 19 contained in the gear box 18 and an electric motor 20 secured to the top of the gear box 18 for electrically folding a mirror body. FIG. 1 only shows the right mirror assembly for simplicity of illustration and left mirror assembly is omitted therefrom.

As shown in FIG. 1, the reduction gear mechanism 19 is composed of a reduction gear train coupled to the worm gear 21 of the output shaft of the electric motor and an end gear 22 is engaged in meshing contact with a clutch gear 23 mounted on the shaft 15. The clutch gear 23 is energized toward a clutch retainer 25 secured to the upper end portion of the shaft by means of the elasticity of a helical spring 24. When a door mirror is erected, that is, disposed at a neutral position, the electric motor 20 is driven by a function of the controller 30 operated by the operation switch 10 which is provided in the compartment, the end gear 22 is rotated through the worm gear 21 and the reduction gear mechanism 19 in FIG. 1. Since the clutch gear 23 engaged in meshing contact with the end gear 22 is mounted on the shaft 15 by means of the elasticity of the spring 24, the clutch gear 23 remains secured to the shaft 15 when a predetermined rotary torque or less in applied thereto. Thus, the rotary force of the end gear 22 is converted to a rotary motion with centering around the shaft 15, thereby the mirror body 17 is rotated in a folding direction by movements of said gear 22. When the electric motor 20 is reversely rotated, the mirror body is swung from the folding position toward the erecting position to return to the original position.

Figure 2:
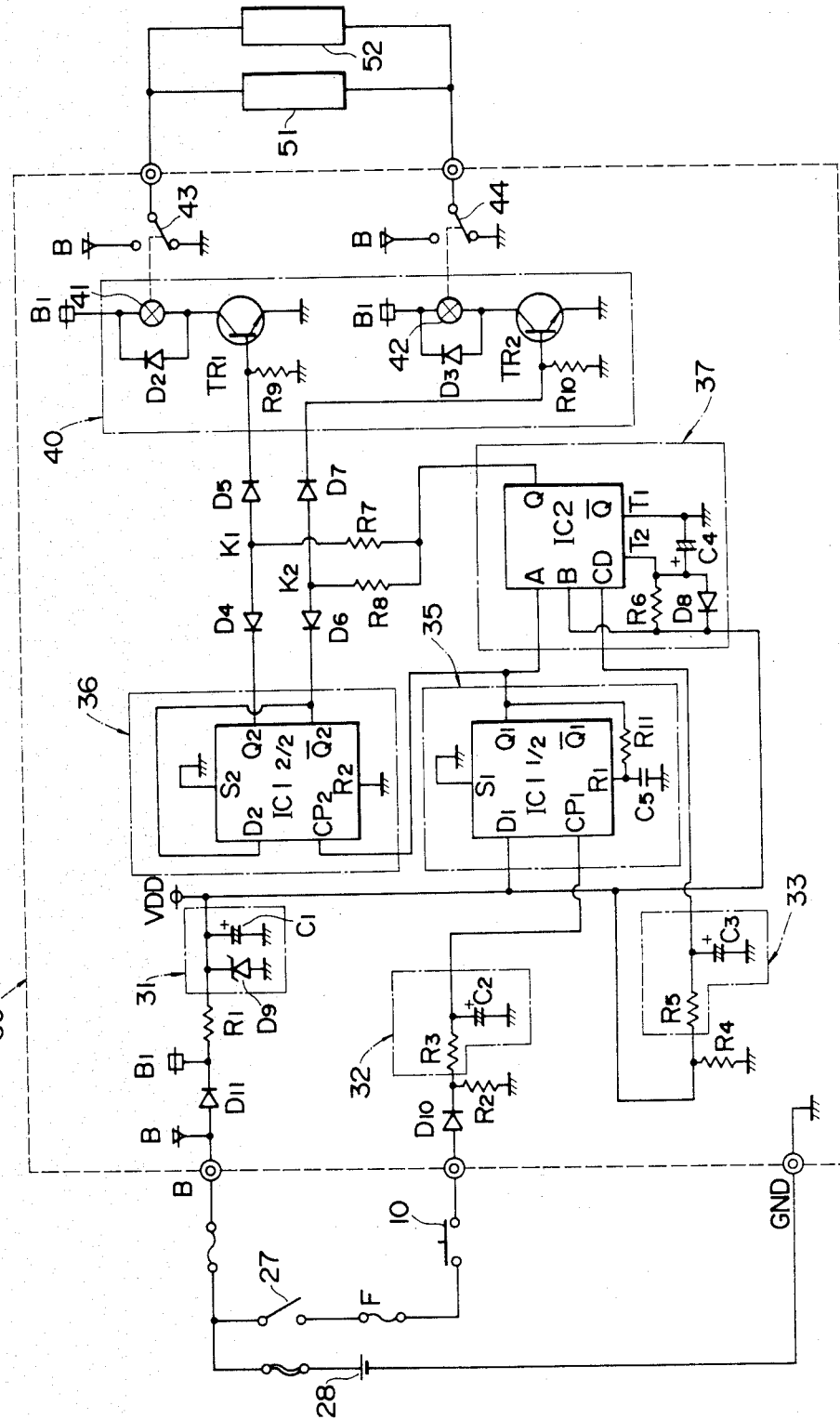
FIG. 2 is a schematic diagram of the same control system.

FIG. 2 is a schematic diagram of the control system. The controller 30 is connected with the operation switch 10, an ignition switch 27 and a battery 28 at the input side thereof, while the motor circuits 51, 52 are connected to the output side of the controller 30. The controller 30 includes a constant-voltage circuit 31, a chatter preventing circuit 32, a delay circuit 33, a trigger circuit 35, a polarity changing circuit 36, a timer circuit 37 and a switching circuit 40.

The motor circuits 51 and 52 are respectively associated in right an left mirror assemblies. Each motor circuit includes an electric motor 20 for folding the mirror body 17 in a folding direction when a current flows from a contact 43 to a contact 44 and for erecting the mirror body 17 when the current flows reversely from the contact 44 to the contact 43. Said motor circuits also include a limit switch group (not shown) for energizing or deenergizing the motor circuits 51, 52 when the mirror body 17 reaches a predetermined folded or erected position by driving the motor 20.

The trigger circuit 35 includes a flip-flop IC1 ½, a resistor $R_{11}$ and a capacitor $C_5$ connected to a reset terminal $R_1$ of the flip-flop. The output of the first output terminal $Q_1$ of the IC1 ½ is returned to the reset terminal $R_1$ through the resistor $R_{11}$ and the capacitor $C_5$. When the output of the first output terminal Q becomes "H" level, the flip-flop ½ is reset in a short time to output a trigger pulse having a narrow pulse width. This pulse is input to the input terminal $CP_2$ of the FF IC1 2/2 and the input terminal A of the timer IC2. A pulse for an operation signal may be input from the automatic reset one-touch type push-button 10 through the chatter preventing circuit 32 to the input terminal $CP_1$ of the IC1 ½.

The IC1 2/2 produces outputs $Q_2$, $\overline{Q_2}$ every time the trigger output $Q_1$ of the IC1 ½ is input to the input terminal $CP_2$ which constitutes the polarity changing circuit 36. Diodes $D_4$ to $D_7$ are connected in parallel to the output side of the IC1 2/2 and connected to the output terminal Q of the timer IC2 through the resistors $R_7$, $R_8$ provided in each dividing points $K_1$, $K_2$ of the diodes $D_4$ and $D_5$, $D_6$ and $D_7$ respectively.

The timer circuit 37 includes a timer IC 2 of retriggerable monostable multivibrator, a resistor $R_6$, a capacitor $C_4$ and a diode $D_8$ connected to the side of terminals $T_1$, $T_2$, and a voltage applied to the input terminal CD rises in delay by the resistor $R_5$ and the capacitor $C_3$ to the supplied voltage $V_{DD}$ at the initial state of connecting a battery (FIG. 3). The output pulse width of the first output terminal $Q_1$ can be set to a predetermined value $t_w$ (outputting time) by the resistor $R_6$ and the capacitor $C_4$ connected to the terminals $T_1$, $T_2$ and said output pulse is applied to the dividing points $K_1$, $K_2$ of the input side of the switching circuit 40.

The switching circuit 40 includes transistors $Tr_1$, $Tr_2$ which operate upon receipt of an input signal "H" at the bases from the points $K_1$, $K_2$ of the input side and relays 41, 42 connected to said transistors to switch the normal or reverse rotation of the motor for folding the mirror by driving the motor circuits 51, 52 through the relay contacts 43, 44.

OPERATION

The operation of the control system constructed as described above will be described. After the battery 28 and ignition switch 27 are connected, the automatic reset type one-touch push-button switch 10 is operated to generate a pulse having a predetermined width (approx. several microseconds) from the output terminal $Q_1$ of the FFIC1 ½ of the trigger circuit 35. Then, the outputs $Q_2$, $\overline{Q_2}$ of the FFIC1 2/2 for changing the polarity are inverted at the same time by the rise of the pulse, and the output Q of the timer IC 2 is set to a predetermined time (e.g., 15±5 sec.) determined by the capacitor $C_4$ and the resistor $R_5$, and the transistors $Tr_1$, $Tr_2$ are alternately operated by the diodes $D_4$ to $D_7$. In this manner, the relays 41,42 are switched to switch the normal or reverse rotation of the electric motor connected externally.

The operation of the control system will be described in more detail.

BATTERY CONNECTED

Since the input of the input terminal CD of the timer IC2 rises in delay of time $t_2$ to the B input by means of the delay circuit 33 when the battery is connected, the output Q of the IC2 is always set to "L" level in an initial state. When the output of the first output terminal $Q_1$ is "H", the FFIC1 ½ is momentarily reset to a time $t_1$ by the pulse (having a width of several microseconds) determined by the time constant of the resistor $R_{11}$ and the capacitor $C_5$. Thus, the output of the terminal $Q_1$ of the IC1 ½ becomes "L" in the initial state. In the initial state that the terminal $Q_1$ is "H", it is momentarily lowered to "L", while it is so set as to be $t_1 < < t_2(t_1 \alpha C_5 R_{11}, t_2 \alpha R_3.R_5)$ in such a manner that the input terminal CD of the IC2 becomes "H" in the lapse of time $t_2$ determined by the $R_5$ and the $C_3$, and the timer IC is thereafter controlled by the operation of the switch 10.

OPERATION SWITH OPERATED

When the ignition switch 27 is closed and the automatic one-touch push-button switch 10 is contacted, the output $Q_1$ of the IC1 ½ becomes "H" to momentarily generate a pulse having a width of several microseconds as described above. Thus, the output terminals $Q_2$, $\overline{Q_2}$ of the IC1 2/2 are inverted substantially at the same time irrespective of the operation time of the switch 10 and the magnitudes of the resistor $R_3$ and the capacitor $C_2$ of the chatter preventing circuit 32 and the pulse "H" having a predetermined time tw determined by the capacitor $C_4$ and the resistor $R_6$ can be output from the terminal Q of the IC2. In this case, when the output terminals $Q_2$, $\overline{Q_2}$ of the IC1 2/2 are respectively "H", "L", the transistor $Tr_1$ is turned ON and the relay 41 is instantly actuated to drive the electric motor to fold the mirror body by the output "H" of the terminal Q of the IC2 and the electric motor stops after the time tw is elapsed.

REOPERATION OF SWITCH

When the operation switch 10 is pushed again after the motor stopped, the outputs $Q_2$, $\overline{Q_2}$ of the IC1 2/2 are respectively inverted to "L", "H", the output Q of the IC2 becomes "H", the transistor $Tr_2$ is turned ON and the relay 42 is actuated, and the electric motor is switched from folding to erecting the mirror body. Then the relay 41, 42 are switched by the operation of the switch 10 to switch electric motor alternatively from folding to erecting the mirror body and vice versa. Since the initial state of the IC1 2/2 is not determined at the first input time by the operation of the push-buttom switch 10 after the battery is connected, either folding or erecting the mirror body is not specified in the initial operation.

When the push-button switch 10 is operated again in a shorter time than the time tw determined by the capacitor $C_4$ and the resistor $R_6$ of the IC2 (during the operation of the IC2) after the push-button switch 10 is operated, the rotating direction of the electric motor is reversed. For instance, the electric motor is switched from folding to erecting the mirror body, and thereafter the mirror body is continuously erected for the time tw.

According to the present invention constructed as described above, the electric motor-driven foldable door mirror is not limited at its operation switch to seesaw type changeover switch and the disadvantage of a shortcircuit at the output of the relay according to the time of switching the operation switch is prevented. Thus, the rearview mirror is prevented from unnaturally operating even by any type of the operation switch and capable of being optionally switched and inverted in folding or erecting the mirror body.

I claim:

1. A control system for a foldable outside rearview mirror, comprising an electric motor having an electric motor circuit; an operation switch; trigger means connected with said operation switch for outputting a trigger pulse in response to actuation of said operation switch; timer means connected with said trigger means for outputting a pulse of a predetermined pulse width to drive said electric motor only for a set time upon receipt of the trigger pulse from said trigger means; polarity changing means having a pair of outputs of high and low level and formed for reversely switching said electric motor by inverting said pair of said outputs upon receipt of the trigger pulse from said trigger means; and switching means for switching a voltage applied to said electric motor to erect or fold a rearview mirror upon receipt of the output of said polarity changing means.

2. A control system as defined in claim 1; and further comprising actuating means for the rearview mirror, said actuating means including a mirror body, a shaft, an end gear connected with and rotatable by said electric motor, and a clutch gear arranged on said shaft in meshing contact with said end gear so as to transmit rotation of said electric motor to said mirror body.

3. A control system as defined in claim 2, wherein said actuating means includes a frame connected with said mirror body and rotatably supported on said shaft so as to rotate said mirror body.

4. A control system as defined in claim 2, wherein said actuating means includes a base, said shaft being fixedly connected with said base.

5. A control system as defined in claim 1, wherein said operating switch is an automatic reset type one-touch pushbutton switch.

6. A control system as defined in claim 1, wherein said trigger means and said polarity changing means includes dual D-type flip-flop integrated circuit.

7. A control system as defined in claim 6; and further comprising an IC-driven power source having a reset terminal; and a chatter preventing means, said polarity changing means having a clock input terminal, said timer means having an input terminal, said flip-flop integrated circuit having a first input terminal connected with said IC-driven power source, a second input terminal connected with said chatter preventing means, and an output terminal connected to said reset terminal of said IC-driven power source, said clock input terminal of said polarity changing means and said input terminal of said timer means.

8. A control system as defined in claim 1, wherein said switching means includes a pair of relays, a transistor and a relay circuit.

9. A control system as defined in claim 1; and further comprising a mirror body, said electric motor being operative for turning said mirror body, said motor circuit including a limit switch group for opening said circuit when said mirror body arrives at a predetermined folded or erected position during the turning.

* * * * *